Sept. 12, 1939. I. D. BLUMENTHAL 2,172,573
EYESHIELD
Filed Aug. 5, 1937
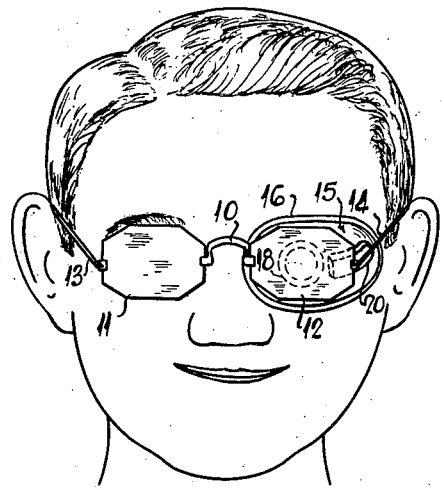
Fig. 1
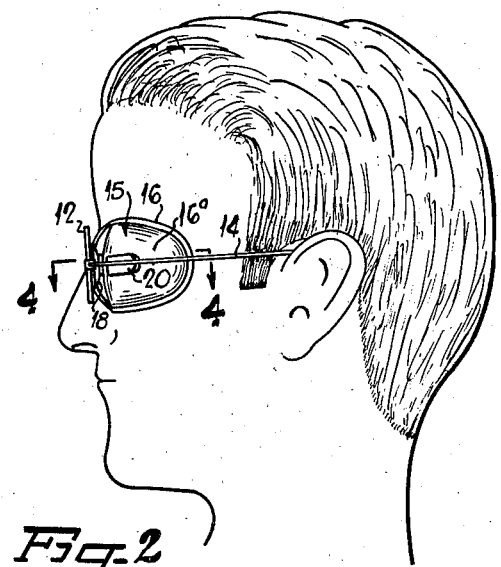
Fig. 2
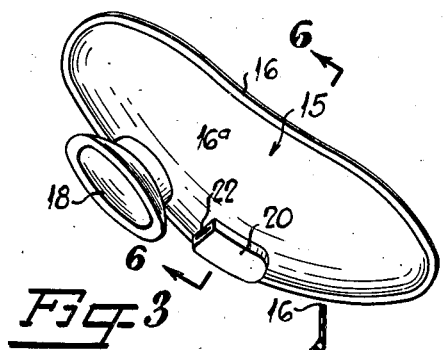
Fig. 3
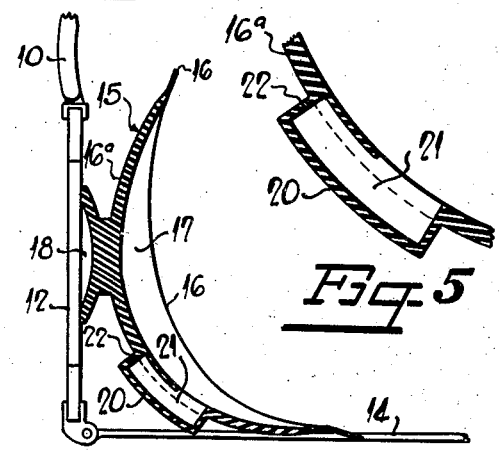
Fig. 4
Fig. 5
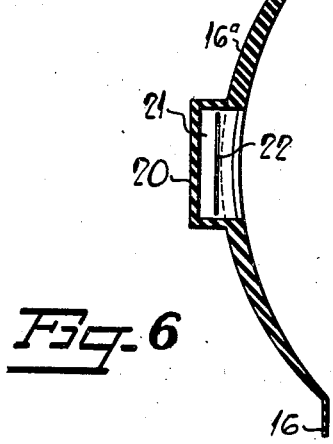
Fig. 6
Inventor:
ISADORE D. BLUMENTHAL
By
Attorney Patented Sept. 12, 1939

2,172,573

UNITED STATES PATENT OFFICE 2,172,573

EYESHIELD

Isadore D. Blumenthal, Charlotte, N. C.

Application August 5, 1937, Serial No. 157,466

2 Claims. (Cl. 2—13)

This invention relates to an eye protector and more especially to a flexible shield which is capable of being detachably secured to the lens of a pair of spectacles so that the shield will be supported in the proper position for guarding the eye. Very often, one's eye becomes irritated or injured so that it is desirable to shield it from light and exposure, but at the same time, it is necessary to use one's glasses on the other eye. If the injured eye is bandaged to form the proper protection, such bandage often protrudes in a manner that will prevent the use of glasses, as well as being very unsightly.

It is therefore, an object of this invention to provide an eye shield for covering the eye which is carried by one of the lenses of a pair of spectacles and which is located between the eye and said lens.

It is a further object of this invention to provide an eye shield which is adapted to fit snugly over one's eye thereby forming a compartment between the eye and the shield, and means for ventilating said compartment to prevent a partial vacuum from being created therein.

Some of the objects of the invention having been stated, other objects will appear as the description proceeds, when taken in connection with the accompanying drawing, in which:

Figure 1 is a view showing my invention secured to one lens of a pair of spectacles;

Figure 2 is a view looking at the right side of Figure 1;

Figure 3 is a perspective view of the eye shield;

Figure 4 is a sectional view taken along line 4—4 in Figure 2 showing portions of the spectacle frame in elevation, both the frame and the shield being removed from the wearer;

Figure 5 is an enlarged, detailed view through the ventilator projection shown in Figure 4;

Figure 6 is a transverse, sectional view taken through the ventilator projection and along line 6—6 in Figure 3.

Referring more specifically to the drawing, the numeral 10 denotes a suitable nose bridge of a spectacle frame to which is secured lenses 11 and 12, which lenses have temple pieces 13 and 14 pivotally secured thereto for hooking behind the ears of the wearer. When it is desired to shield one of the eyes a suitable flexible protector 15 is secured to the inside surface of one of the lenses so that its rim 16 will fit snugly against the face and around the eye. When in this position there will be a substantial clearance between the eye and the guard since the shield has a sunken portion 17 therein. This sunken portion or compartment allows room for a limited amount of bandage to be placed upon the eye, should this be necessary.

Integral with the convex surfave 15a of the protector is a vacuum cup 18 which is adapted to be pressed against the surface of one of the lenses so that the protector will be supported by a lens in the proper position to shield the eye. This convex surface also has a projection 20 integral therewith in which a cavity 21 is provided, said portion communicating with compartment 17. By referring to Figures 3 and 4, it is seen that projection 20 has a slit 22 therein which allows a limited amount of air to enter or leave cavity 21 and compartment 17 to supply the necessary ventilation should the rim portion become sealed to the face of the wearer. In other words, due to this ventilation, it is impossible for a partial vacuum to be formed within the compartment, but instead, atmospheric pressure is maintained therein.

Figure 4 shows the position which the shield assumes when the assembly is removed from the face of the wearer, but when in an operative position, the rim 16 will substantially conform to the contour of the face since the shield is made of a flexible material such as soft rubber.

It is therefore seen, that I have provided a neat, inconspicuous eye shield which can be detachably secured to either lens of a pair of spectacles and which will automatically assume its proper position when the spectacles are put on by the wearer.

Special attention is directed to projection 20 with its slit 22 to admit air to the eye of the wearer through the cavity 21. This slit is very narrow, as if cut with a razor blade. Instead of being an open hole through which dust and foreign particles injurious to the eye, might be admitted, I have provided a slit, as if cut with a razor blade, which the normal pressure of the molded rubber holds practically in a closed position at all times. This opening however, is ample to admit the necessary air, to prevent the eye from sweating. At the same time, the slit 22 will not allow cinders or dust or similar solids to pass therethrough to injure the eye disposed beneath the occluder.

Attention is also called to the projection 20 and the double purpose it serves, that is, it provides a trapped passageway for air to enter beneath the occluder, and it also provides a projection which fits against the temple pieces 14 or 13 as the case may be. As will be observed in the drawing, the projection 20 acts as a guide upon which the temple piece 13 or 14 will rest when the spectacles with said shield or occluder are placed in position on the head of the wearer. In this normal position the pressure of the temple piece upon the projection 20 assures, even on a windy day, that the outer circumference of the shield fits snugly against the face of the wearer at all points along the circumference of the shield. If it were not for this projection 20 being of a heavier piece of rubber and if the fit of the shield against the face depended solely on the vacuum cup, in some instances, the outer circumference of the shield would not be held against the skin with pressure at all points, and this would defeat the purpose of the shield in that its purpose to entirely exclude light and dust particles.

If the temple piece should rest against the plain exterior of the shield the wall thickness of the shield would not be of sufficient thickness to apply the desired pressure from the temple piece and the temple piece would form a groove in the shield and might not hold the circumference of the shield in contact with the face at all points of said circumference. Therefore, in spite of differences in facial contour, an ideal tight fit is obtained by the pressure of the temple piece on the projection 20.

Attention is also directed to the peculiar construction of the rim 16. The advantages of this thin flexible rim add greatly to the operability of the shield. A sharp rigid edge might prove uncomfortable to the wearer, while a flat, soft surface, as shown, provides perfect contact and comfort to the wearer.

It will be further noted that there is a variation in the wall thickness, starting out with a somewhat thicker wall at the top of the curved surface and tapering down to a thinner wall at the junction of the convex portion 16a with the flexible rim 16. This variation has a tendency to maintain a balance of gravity when the shield is in a normal position, not installed on a spectacle lens. At the same time, for a good fit, the correct amount of pressure is maintained against the face by the extreme edges when in use. This construction of variable thickness also eliminates the possibility of the shield curling up or possibly inverting itself more or less, inside out, during a strong wind.

In the drawing and specification there has been set forth a preferred embodiment of the invention, and although specific terms are employed, they are used in a generic and descriptive sense only, and not for purposes of limitation, the scope of the invention being set forth in the appended claims.

I claim:

1. In combination, a pair of spectacles, a soft rubber concave-convex shield member having vacuum means on the forward side thereof for securing the same to the rear surface of one of the lenses of the spectacles and having a rearwardly extending portion adapted to surround and shade the eye, the forward surface of said shield having a projection provided with a cavity communicating with the rear surface of the shield and one end of said projection having a slit therein for allowing ventilation in the area enclosed by the shield when worn over an eye.

2. In combination, a pair of spectacles, eye glasses and the like having lenses disposed in front of the eye of the wearer, a shield for one of the eyes comprising a soft rubber member of concavo-convex form and having vacuum means on its convex side adapted to be secured to the rear surface of one of the lenses and having a concave surface on its rear side adapted to cover the eye disposed behind said lens, the outer edge of said shield being of thinner material than the remaining portion of the shield so as to form a snug fit against the face of the wearer, a projection on the forward or convex side of said shield having a cavity therein communicating with the rear surface of the shield and having a slit in one side portion of said projection for allowing ventilation to the concave surface of said shield when it is worn over an eye, said projection being so positioned as to be engaged by one of the temple pieces of the pair of spectacles to assist in holding the shield against the face of the wearer.

ISADORE D. BLUMENTHAL.